United States Patent [19]

Katsuta et al.

[11] Patent Number: 5,073,829
[45] Date of Patent: Dec. 17, 1991

[54] CASSETTE SUPPLY APPARATUS

[75] Inventors: Tsuyoshi Katsuta; Yasuhito Shiraishi, both of Hino, Japan

[73] Assignee: Konica Corporation, Tokyo, Japan

[21] Appl. No.: 575,418

[22] Filed: Aug. 30, 1990

[30] Foreign Application Priority Data

Sep. 5, 1989 [JP] Japan .................................. 1-228218
Jul. 26, 1990 [JP] Japan .................................. 2-196150

[51] Int. Cl.$^5$ ............................................. H04N 1/04
[52] U.S. Cl. .................................... 358/498; 355/308; 355/321
[58] Field of Search ................ 358/498, 474; 355/308, 355/309, 321, 322; 414/331, 277

[56] References Cited

U.S. PATENT DOCUMENTS

| | | | |
|---|---|---|---|
| 4,281,919 | 8/1981 | Nonumura et al. | 355/309 |
| 4,566,547 | 1/1986 | Furukawa | 355/309 |
| 4,568,177 | 2/1986 | Sato et al. | 355/309 |
| 4,839,740 | 6/1989 | Yoshida | 358/498 |

Primary Examiner—Leo H. Boudreau
Assistant Examiner—Steven P. Fallon
Attorney, Agent, or Firm—Jordan B. Bierman

[57] ABSTRACT

A cassette supply apparatus wherein cassettes that hold documents are stacked in the vertical direction and stored in a cassette holding stacker. When a cassette is supplied to an image reading apparatus the lowermost cassette stored in the cassette holding stacker is coincident in height with a cassette supply port of the image reading apparatus and when the cassette is returned from the image reading apparatus a cassette discharge port is coincident in height with the uppermost cassette in order to return the cassette on the uppermost cassette stacked in the cassette holding stacker on the basis of the discriminated position. In case that a take in-and-out port of the image reading apparatus serves both as the cassette supply port and the cassette discharge port and when the cassette is supplied to or returned from the image reading apparatus the lowermost or uppermost cassette stored in the cassette holding stacker is coincident in height with the cassette take in-and-out port of the image reading apparatus, respectively.

8 Claims, 13 Drawing Sheets

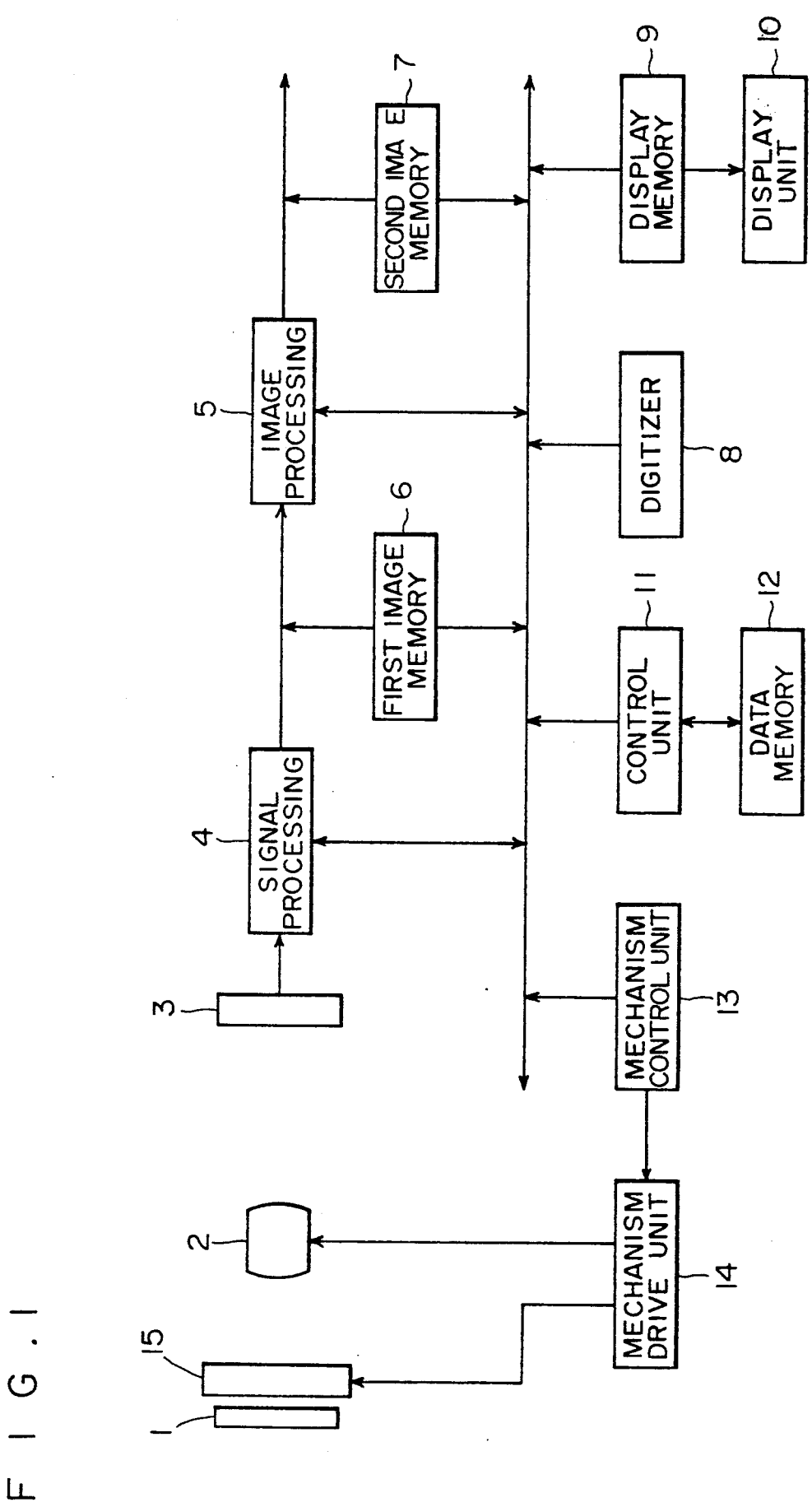

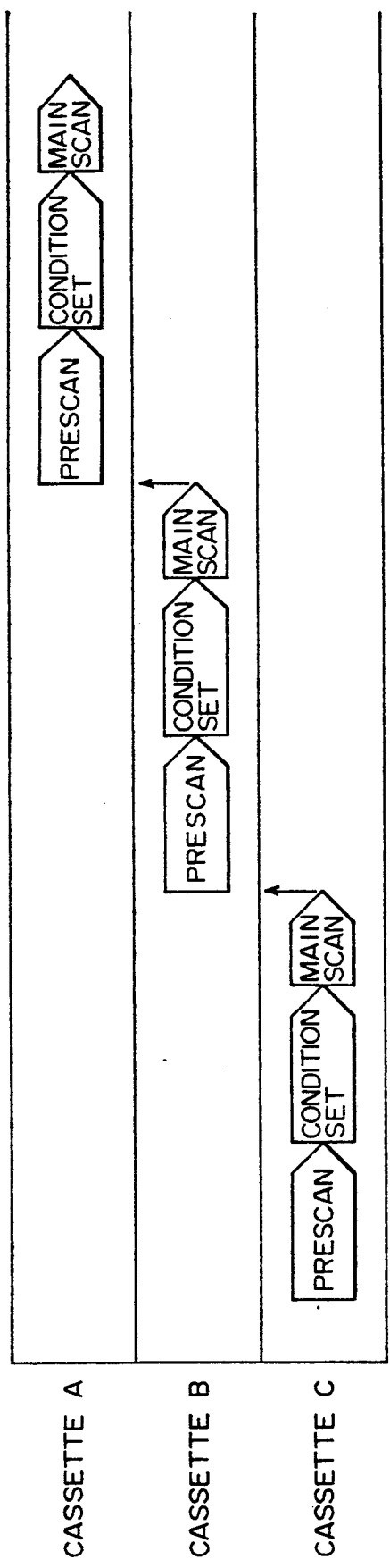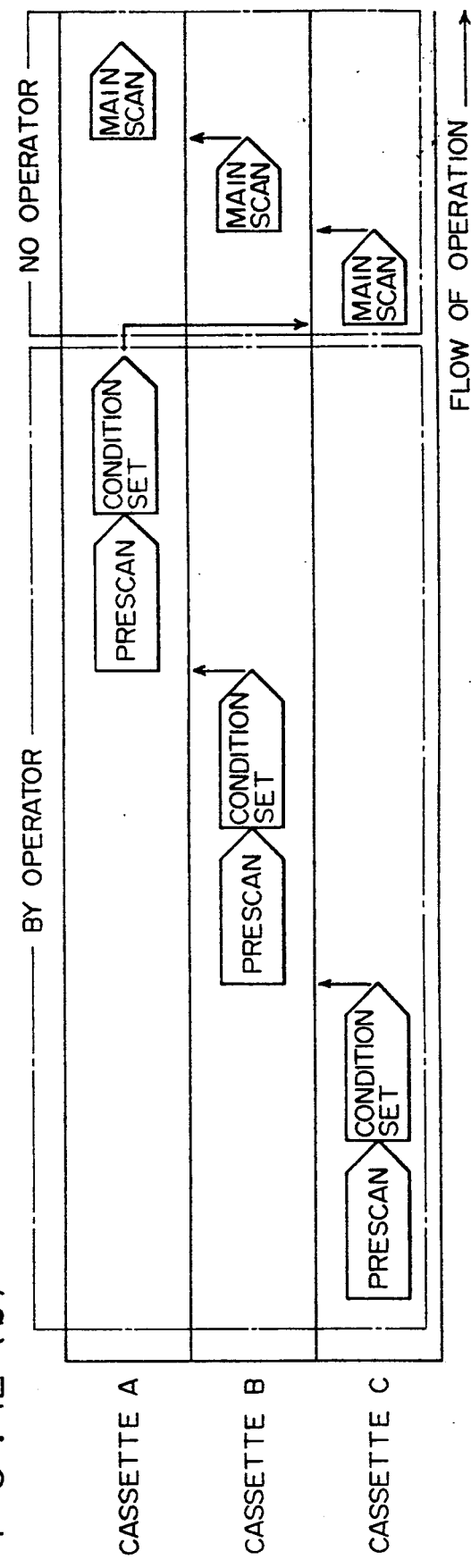

CASSETTE SUPPLY APPARATUS

BACKGROUND OF THE INVENTION

1. Field of the Invention

The present invention relates to a cassette supply apparatus that holds documents in a flat state and supplies to an image reading apparatus for reading the documents and converting the documents into electric signals.

2. Description of the Prior Art

In the art of multicolor plate-making, so far, the images are input by using an image reading apparatus and a magnification measuring instrument.

The above image reading apparatus is called a color separation scanner, and works to scan a document such as a two-dimensional color photograph, i.e., reads the document, and outputs electric signals representing the separated colors. The electric signals are used for color printing.

A drum (transparent cylinder) has heretofore been used as means for holding a document to be read by the image reading apparatus. In this case, the document is stuck with an adhesive tape or the like to the peripheral surface of the drum, and then the drum is rotated, so that the document may be read by a sensor.

However, the document-holding device using such a drum involves problems as described below.

That is, the sheet-like document stuck onto the peripheral surface of the drum is curved.

Therefore, the convenience in handling the document is not good, and the expensive drum and document may be damaged.

In particular, the documents which are the properties of clients should never be damaged.

In order to increase the speed of reading the documents, furthermore, the drum must be rotated at high speeds, causing the apparatus to become bulky.

The present applicant therefore has previously proposed an image inputting device (Japanese Utility Model Application No. 170271/1988) using, as a document-holding device, a cassette that holds the planar document as it is, not curved.

The document-holding device using such a cassette enables the planar document to be easily handled in its own form and further enables the document to be read at high speeds without causing the apparatus to become bulky.

The sizes of the aforementioned documents, for example, are of 35 mm, 6×9 cm, 4×5 in., etc.

The above-mentioned cassettes have heretofore been contained in a container box called stacker 70, as shown in FIG. 16. The stacker 70 is provided with a plurality of stepped portions 70a to contain a plurality of cassettes 71 in the vertical direction.

The stacker 70 is set onto a stacker plate from which the cassettes 71 are supplied one by one to the side of the document plate.

In this case, there is provided with a delivery device which pushes forward the cassettes 71 contained in the stepped portions 70a of the stacker 70 by a pushing member to deliver them successively from the stacker 70, and a sending device which sends the cassettes 71 delivered from the stacker 70 to the side of the image reading apparatus, and returns the cassettes 71 from the side of the image reading apparatus to the stepped portion 70a where the cassette 71 has been initially contained in the stacker 70.

However, the conventional cassette supply apparatus comprising the stacker 70, delivery device and sending device causes the problem mentioned below.

That is, in the conventional stacker 70, a plurality of stepped portions for containing a plurality of cassettes stepwise one by one in the vertical direction are provided, so that the overall height and size become large.

Further, it is necessary to position the cassette when the cassette 71 is taking in and taking out, so that the store of the cassette 71 becomes troublesome.

That is, an operation must be carried out for each delivery of cassette 71 to bring the position of the pushing member into agreement with the stepped portion 70a of the delivered cassette 71 by raising or lowering the stacker 70, and another operation must further be carried out for each delivery of cassette 71 to bring the position of the sending portion of the sending device into agreement with the stepped portion 70a of the returned cassette 71 by raising or lowering the stacker 70.

So far, therefore, it has been necessary to strictly position the pushing member of the sending device at the stepped portion 70a of the cassette 71, and the sending portion of the sending device at the stepped portion 70a of the returned cassette 71. Accordingly, complex control operation has been required to drive the stacker plate for raising or lowering the stacker 70, causing disadvantage in the cost of production.

SUMMARY OF THE INVENTION

In view of the aforementioned problems inherent in the prior art, an object of the present invention is to provide a cassette supply apparatus that holds documents, which enables the stacker to be made small in size and the stacker to be driven through simple control operation, and which is advantageous in cost.

The above object can be achieved by a cassette supply apparatus for supplying cassettes each of which holds a document in a flat state to an image reading apparatus for reading the document and for converting the document into an electric signal comprising a cassette holding stacker for containing therein said document holding cassettes stacked in the vertical direction.

discriminating means for discriminating a position of the uppermost cassette stacked in said cassette holding stacker, an elevator for moving up and down said cassette holding stacker, cassette supply means for taking out the lowermost cassette in said cassette holding stacker and supplying the cassette taken out toward a cassette supply port of the image reading apparatus, cassette return means for taking out a cassette through a cassette discharge port of the image reading apparatus and for returning the cassette taken out toward said cassette holding stacker, and elevator control means for controlling said elevator so that when said cassette is supplied to said image reading apparatus the lowermost cassette stored in said cassette holding stacker is coincident in height with said cassette supply port of the image reading apparatus and that when the cassette is returned from said image reading apparatus said cassette discharge port is coincident in height with the uppermost cassette in order to return said cassette on the uppermost cassette stacked in said cassette holding stacker on the basis of the discriminated position.

It is preferable to control said elevator by said elevator controlling means so that in case that a take in-and-out port of said image reading apparatus serves both as the cassette supply port and the cassette discharge port and when said cassette is supplied to said image reading apparatus the lowermost cassette stored in said cassette holding stacker is coincident in height with said cassette take in-and-out port of the image reading apparatus and that when the cassette is returned from said image reading apparatus said cassette take in-and-out port is coincident in height with the uppermost cassette in order to return said cassette on the uppermost cassette stacked in said cassette holding stacker on the basis of the discriminated position.

It is preferable that said cassette holding stacker is of nearly box shape having a cassette take in-and-out port in the front surface thereof and an opening for pushing out a cassette in the rear surface thereof.

It is preferable that said cassette has magnets different in polarity from each other at the front and rear surfaces thereof, respectively, so that the cassettes are stacked in the cassette holding stacker in a state that the cassettes are connected one another by the mutual magnetic attracting forces.

It is preferable that each cassette is taken out from the lowermost position in the stacked cassettes, successively, in order to read formally the cassettes by the image reading apparatus after all cassettes in the cassette holding stacker are read temporarily and the cassette which has been supplied to said image reading apparatus and read temporarily thereby is returned on the uppermost cassette.

It is preferable that said image reading apparatus has memory means for memorizing on a recording medium at least one of informations obtained by the temporary reading and the formal reading.

It is further preferable that said cassette has a frame member with an opening portion, and a mask plate with a transparent mask portion, the mask plate being the same in size with said opening portion and set to said frame member.

It is preferable especially to provide indicating means for indicating the size of said transparent mask portion is provided on said cassette so that said image reading apparatus can discriminate the size of the transparent portion of the mask plate.

Said size indicating means can be formed of convex portions, concave portions or hole portions different from one another according to the size of the transparent portion, provided on the outer periphery of the mask plate.

In the aforementioned constitution, the cassettes that hold documents are stacked in the vertical direction and stored in the cassette holding stacker.

When said cassette is supplied to said image reading apparatus the lowermost cassette stored in said cassette holding stacker is coincident in height with said cassette supply port of the image reading apparatus and when the cassette is returned from said image reading apparatus said cassette discharge port is coincident in height with the uppermost cassette in order to return said cassette on the uppermost cassette stacked in said cassette holding stacker on the basis of the discriminated position.

In case that a take in-and-out port of said image reading apparatus serves both as the cassette supply port and the cassette discharge port and when said cassette is supplied to said image reading apparatus the lowermost cassette stored in said cassette holding stacker is coincident in height, with said cassette take in-and-out port of the image reading apparatus and that when the cassette is returned from said image reading apparatus said cassette take in-and-out port is coincident in height with the uppermost cassette in order to return said cassette on the uppermost cassette stacked in said cassette holding stacker on the basis of the discriminated position.

Thus, the cassette holding stacker can be made compact and driven by simple means.

The cassette holding stacker is nearly box-shaped with the cassette take in-and-out port in the front surface and with the opening for pushing out the cassette in the rear surface, so that it can be made small in size.

Further, the cassette has at the front and rear surfaces thereof the magnets different in polarity, so that the cassettes are stacked in the cassette holding stacker in the state that the cassettes are connected one another by the mutual magnetic attracting forces. Accordingly, wrong stacked state can easily be found.

The cassette has the frame member with the opening portion, and the mask plate with the transparent portion and the mask portion, the mask plate being the same in size with said opening portion and set to said frame member. The cassette has the indicating means for indicating the size of said transparent portion so that said image reading apparatus can discriminate the size of the transparent portion of the mask plate. Accordingly, it is not necessary to prepare plural kinds of cassettes, causing advantages in the number of parts, in the maintenance of parts and in cost of manufacturing. Further, the reading area corresponding to the size of the document is defined, so that the waste reading can be prevented and the necessary minimum reading of the document can positively and precisely be carried out.

Especially, the size indicating means is formed of convex portions, concave portions or hole portions different from one another according to the size of the transparent portion, provided on the outer periphery of the mask plate. Accordingly, the mask plate can be formed simply.

Further, the cassette is taken out from the lowermost position in the stacked cassettes, successively, in order to read formally the cassettes by the image reading apparatus after all cassettes in the cassette holding stacker are read temporarily and the cassette which has been supplied to said image reading apparatus and read temporarily thereby is returned on the uppermost cassette the formal reading can be carried out economically without assistance of the operator.

The image reading apparatus has the memory means for memorizing on the recording medium at least one of informations obtained by the temporary reading and the formal reading. Accordingly, if the time interval between the temporary reading and the formal reading becomes large, the reading condition etc. can be memorized, which is an advantage.

Other objects and features of the present invention will be described below in conjunction with the drawings.

BRIEF DESCRIPTION OF THE DRAWINGS

FIG. 1 is a block diagram illustrating the electric constitution of an embodiment according to the present invention;

FIGS. 12(a) to 12(b) are views explaining flows of operations in the image reading apparatus, respectively;

DESCRIPTION OF THE PREFERRED EMBODIMENT

Figure 3:
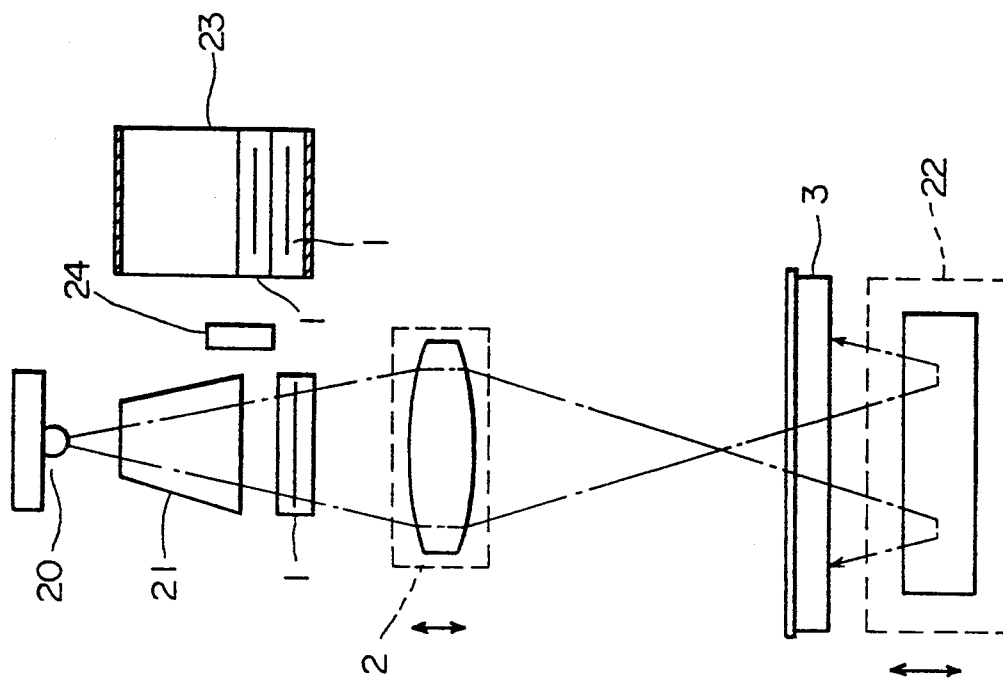
FIGS. 2 and 3 are sectional views illustrating mechanical constitutions of an embodiment according to the present invention.

An embodiment of the present invention will now be described in conjunction with the drawings.

FIG. 1 is a block diagram illustrating electrical structure of an embodiment of an image reading apparatus to which is adapted a device for feeding document-holding cassettes of the present invention.

In FIG. 1, a document is contained in a cassette 1 that constitutes a document-holding device which will be described later in detail. The image of the document is focused on a line sensor 3 through a lens 2. The line sensor 3 converts the optical image into electric signals. When a color document is to be read, the line sensor 3 consists of a combination of a plurality of line sensors and a filter (or a dichroic mirror). Or, there may be used a single line sensor and a filter that can be switched at high speed, or a line sensor incorporating a filter. The output of the line sensor 3 is converted into an image signal through a signal processing circuit 4 and is subjected to the signal processing such as shading correction or zero-level correction.

There are further provided an image processing circuit 5 that effects image processing necessary for the plate-making, such as color correction (R, G, B→Ye, M, K, Cy), gradation conversion, edge emphasis, etc., a first image memory 6 that stores data after the signal processing, and a second image memory that stores data after the image processing. There are further provided a digitizer 8 which receives an instruction from a pointing device, a display memory 9 that stores data for display, a display unit 10 that displays data stored in the display memory 9, a control unit 11 which controls the whole apparatus, a data memory 12 which stores data related to the document according to an instruction from the control unit 11, a mechanism control unit 13 for controlling lens and the like that must be mechanically controlled, a mechanism drive unit 14 that drives lens and the like, and a document plate 15 that holds the cassette 1, and turns and sends the document.

Figure 2:
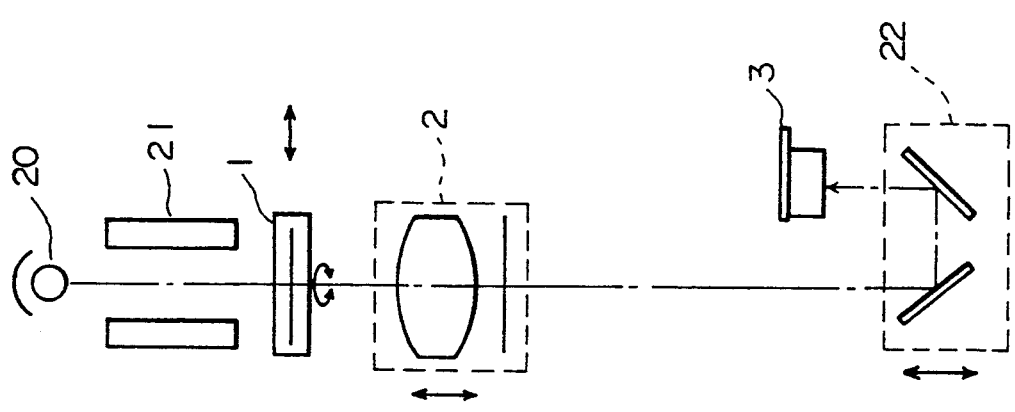

FIGS. 2 and 3 are sectional views illustrating mechanical constitution of the embodiment of the above image reading apparatus.

In these Figs., light from a source of light 20 with which the document is irradiated is condensed by a condensing unit 21.

The transmitted light from the document is directed to the line sensor 3 through a V-mirror unit 22. A plurality of cassettes 1 are contained in a stacker 23 which will be described later in detail, and are fed one by one. A recognition unit 24 is provided which recognizes a number recognizing code that will be described later and is imparted to the cassette 1 in advance, when the cassette 1 is being taken out from the stacker 23.

Next, the constitution of the document-holding device will be described in conjunction with FIG. 4.

Figure 4:
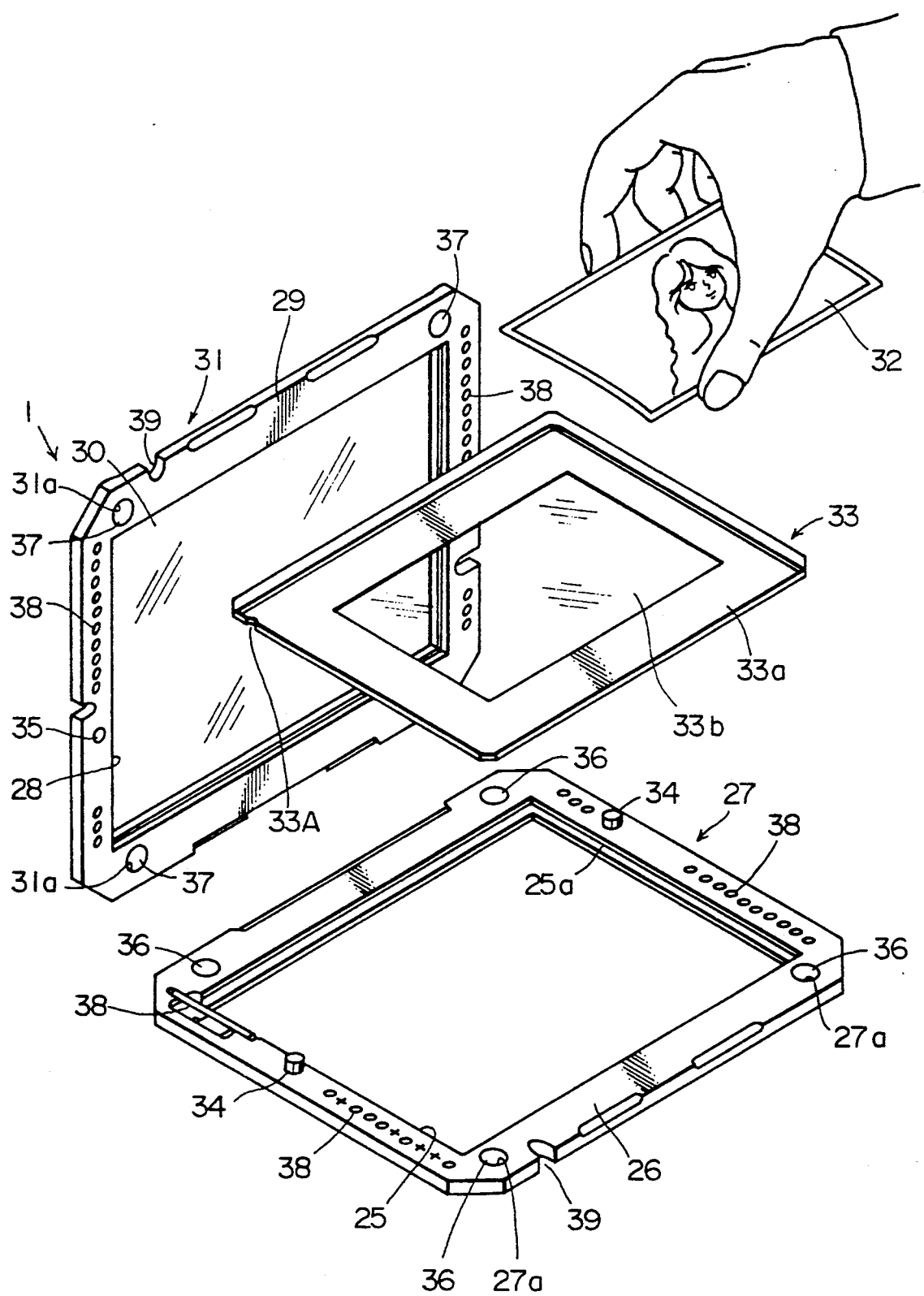
FIG. 4 is a perspective view of a cassette supply apparatus of an embodiment according to the present invention.

In FIG. 4, the cassette 1 has a lower plate 27 consisting of a frame member 26 with an window 25, an upper plate 31 consisting of a frame member 29 with a window 28, a support plate 30 made of a transparent member disposed in the window 28, the upper plate 31 being superposed on the lower plate 27, and coupling means for coupling the upper plate 31 and the lower plate 27 together. A plural kinds of mask plates 33 each made of a circumferential frame-like mask portion 33a in correspondence with the sizes of documents are prepared to mask the peripheral portions of the documents 32, the mask plates 33 having a transparent portion 33b at the center of the mask portion 33a and being detachably fitted to the window 25 of the lower plate 27 so that the document 32 can be placed thereon.

It is preferable that the mask plate 33 is made of a rectangular transparent acrylic plate that is hardened, and the periphery thereof is provided with a black mask portion 33a except the central rectangular portion.

Here, the frame member 26 of the lower plate 27 is formed of a resin such as a plastic material in nearly a rectangular shape, and the window 25 is formed in a rectangular shape too. The inner peripheral surface of the window 25 has a step 25a, and the mask plate 33 is placed on the step 25a.

The frame member 29 of the upper plate 31 is made of a resin such as a plastic material in nearly a rectangular shape in the same size as that of the frame member 26 of the lower plate 27, and the window 28 is formed in rectangular shape in the same size as that of the window 25 of the lower plate 27. The transparent support plate 30 made of a transparent acrylic plate of a rectangular shape is fitted and secured to the inner peripheral portion of the window 28.

In this case, the support plate 30 is so designed that the outer surface thereof becomes lower by one step than the outer surface of the frame member 29 of the upper plate 31. Hence, even when the cassettes are stacked one upon the other, the outer surface of the support plate 30 will not be damaged.

Projections 34 are formed on the upper surface on both sides of the frame member 26 of the lower plate 27 and holes 35 are formed in both side portions of the frame member 29 of the upper plate 31, such that the lower plate 27 and the upper plate 31 are put together.

Magnets are used as means for coupling the lower plate 27 and the upper plate 31 together.

That is, circular holes 27a are formed in the four corners of the lower plate 27, and circular magnets 36 are fitted to the holes 27a and are secured thereto.

The magnets 36 are so set that the exposed portions on the upper surface side of the lower plate 27 are all, for example, of the N pole.

Furthermore, circular holes 31a are formed in the four corner portions of the upper plate 31, and circular magnets 37 are fitted and secured in the holes 31a. The magnets 37 are so set that the portions exposed to the lower surface side of the upper plate 31 are all of the S pole.

When the lower plate 27 and the upper plate 31 are put together, therefore, the magnets 36 and 37 at the corners of the two plates 27 and 31 attract each other, and the two plates 27 and 31 are coupled together.

Under the condition that the lower plate 27 and the upper plate 31 are stacked, the ends of the magnets 36 exposed to the lower surface side of the cassette 1 are all of the S pole and the ends of the magnets 37 exposed to the upper surface side are all of the N pole. When a plurality of cassettes 1 are stacked one upon the other therefore, the magnets 36 and 37 attract each other and the cassettes 1 are properly stacked when each of them is assembled with proper front-and-back relationship. When the front-and-back relationship is not properly maintained, the magnets 36 and 37 repel each other, and the cassettes 1 are not stacked normally, letting the user know that the cassettes 1 are not properly stacked.

A plurality of holes 38 that serve as a cassette number recognizing code are formed in line on both sides of the frame members 26 and 29 of the lower plate 27 and the upper plate 31. The holes 38 in the frame member 26 meet the holes 38 in the frame member 29.

In this embodiment, the holes 38 are formed at specific points in a plurality of points, and the points are different in each cassette 1 so that the cassette number can be recognized.

The cassette number recognizing code is used for reading a variety of data such as color data, magnification, angle, etc. that are to be stored at the time of reading the document 32 for each of the cassettes.

That is, light is permitted to pass through the holes 38, and optical detecting means determines which holes 38 are open by detecting the transmitted light, thereby to recognize the cassette number.

In this case, plural kinds of cassette number recognizing codes can be provided according to the number of holes 38 and the positions of open holes.

Some of the holes 38 that constitute the cassette number recognizing code functions as an identification code which is used to automatically transmit the size of the document 32 in the cassette 1 to the side of the apparatus.

This constitution has a relationship to the mask plate 33 and will be described together with the mask plate 33 that is mentioned later.

A protuberance or a recess corresponding to a stacker 23 mentioned later is provided on a portion of the cassette 1 in which the lower plate 27 and the upper plate 31 are coupled. Therefore, an inverted cassette 1 is not inserted in the stacker 23. In this embodiment, a recess 39 is provided in the front edge of the cassette 1.

The mask plate 33 is placed on a stepped portion 25a on the inner periphery of the window 25 of the frame member 26 of the lower plate 27 as described above, and a document 32 is placed on the upper surface thereof.

Described below is the constitution in which some of the holes 38 forming a cassette number recognizing code in the frame member 26 of the lower plate 27 functions as an identification code which is used to automatically transmit the size of the document 32 in the cassette 1 to the side of the apparatus.

Figure 5A:
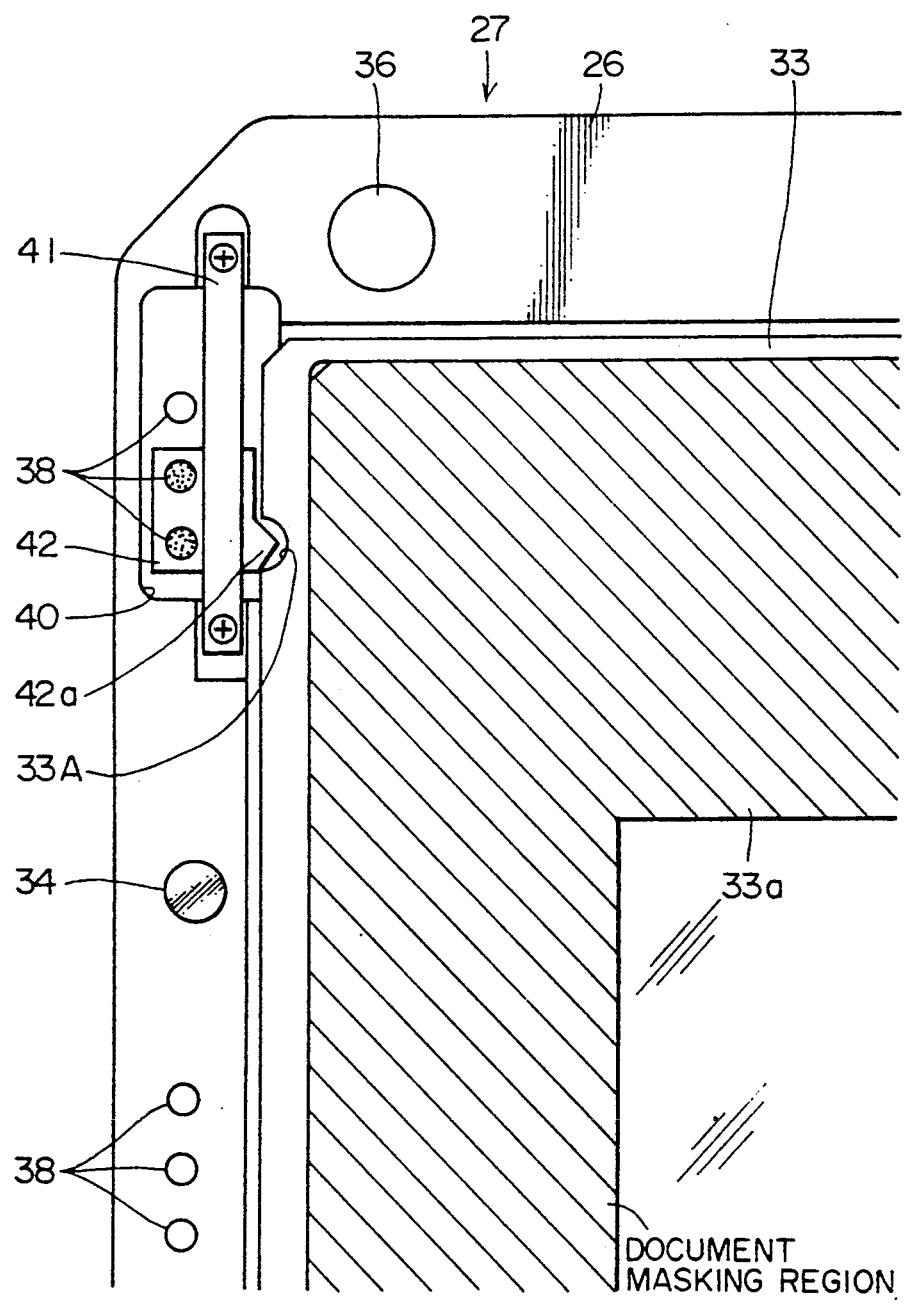
FIGS. 5(a) to 5(c) are enlarged plan views illustrating said cassette.
Figure 5B:
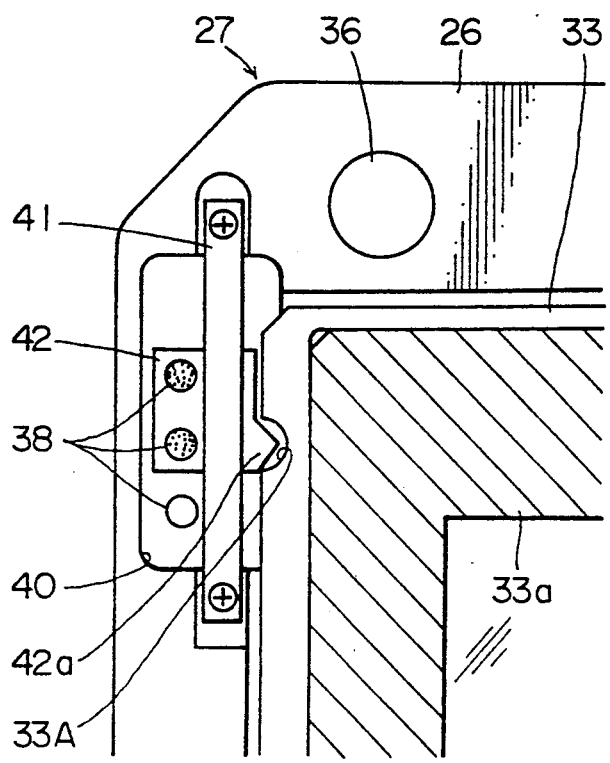
Figure 5C:
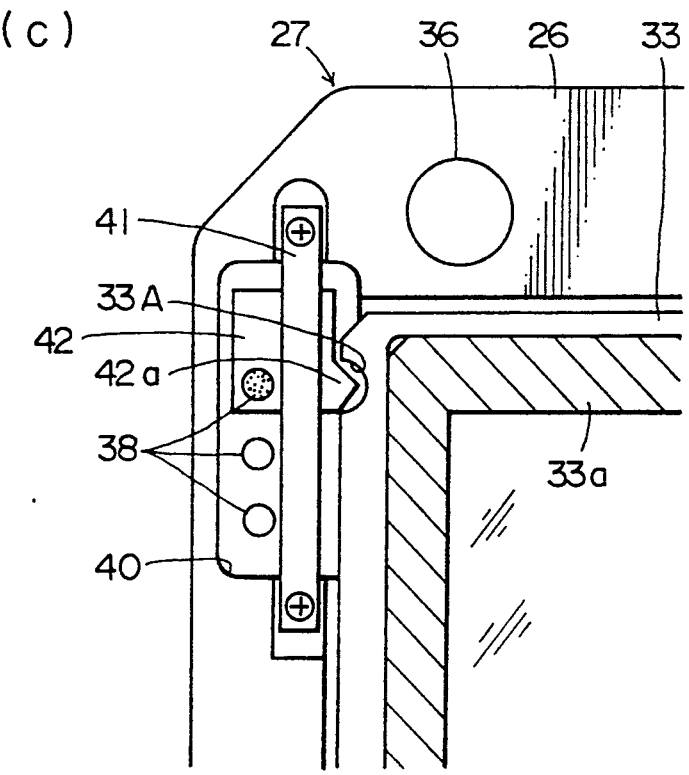

That is, in FIGS. 5(a) to 5(c), provision is made of closing means that selectively closes the plurality of holes 38 in accordance with the kind of the mask plate 33 that corresponds to the document size. The closing means is structured as described below.

A rectangular recess 40 is formed in one side of the frame member 26 of the lower plate 27 at an upper rear position, and three holes 38 are formed in the recess 40. Over the open surface of the recess 40 is extended a guide plate 41 of which the two ends are fastened by screws to front and rear portions of the recess 40 in the side upper surface of the frame member 26. On the guide plate 41 is slidably mounted a pawl plate 42. Depending upon the slide position, the pawl plate 42 functions to close the part of the three holes 38 from the upper direction.

Referring to FIG. 5(a), when the pawl plate 42 is positioned at one end on the open surface of the recess 40, the two holes 38 positioned at one end of the recess 40 are closed. When the pawl plate 42 is positioned at the middle of the open surface of the recess 40 as shown in FIG. 5(b), the two holes positioned at the other end of the recess 40 are closed. When the pawl plate 42 is positioned at the other end of the open surface of the recess 40 as shown in FIG. 5(c), only one hole 38 positioned at the other end of the recess 40 is closed.

The slide positions of the pawl plate 42 are determined according to the kind of the mask plate 33.

That is, a groove 33A is formed at a different position in the side edge of plural kinds of mask plates 33 provided to meet the sizes of the documents 32.

If a pawl portion 42a of the pawl plate 42 is fitted to the groove 33A at the time when the mask plate 33 is set on the lower plate 26, the pawl plate 42 corresponds to the position of the groove 33A and is held at that position, so that the aforementioned three closed conditions are obtained.

In this embodiment, the close condition shown in FIG. 5(a) is that of the case of the document of the size of 35 mm, the close condition shown in FIG. 5(b) is that of the case of the document of the size of 6×9 cm, and the close condition shown in FIG. 5(c) is that of the case of the document of the size of 4×5 in.

Said groove 33A formed in the side edge of the mask plate 33 is provided in each cassette so that the image reading apparatus can recognize the size of the document, that is, the size of the transparent portion of the mask plate. The groove 33A corresponds to size indicating means of the present invention.

Figure 6:
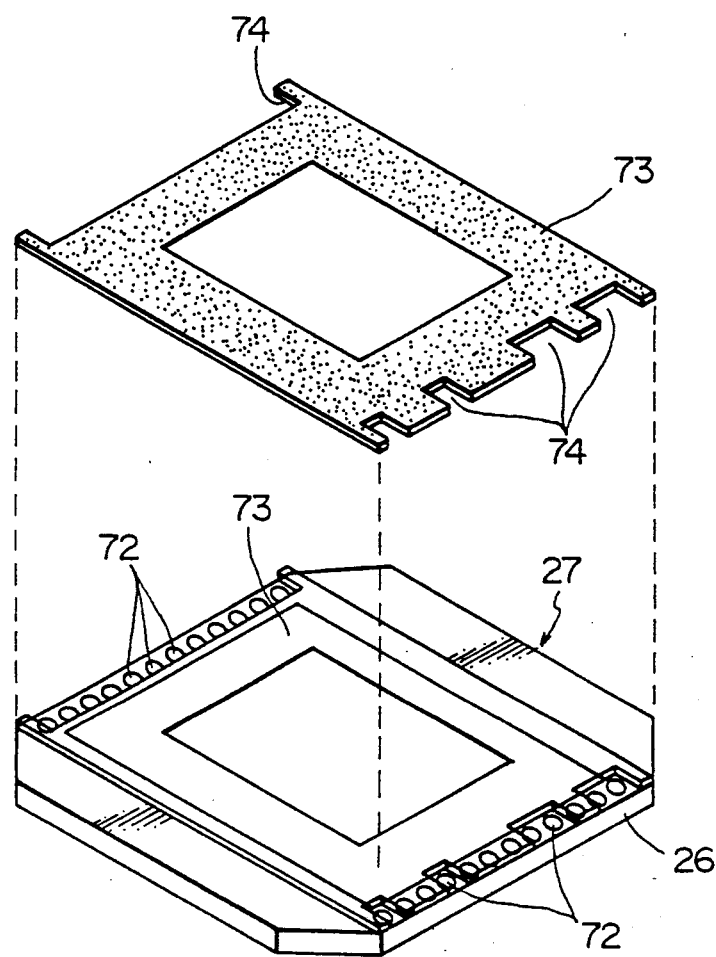
FIGS. 6 and 7 are perspective views of cassette supply apparatus of another embodiments according to the present invention.

As shown in FIG. 6, in the other embodiment of the present invention, a plurality of holes 72 serving the cassette number recognizing code and document size recognizing code are provided on both sides of frame member 26 of the lower plate 27, and cut-away grooves 74 are provided on the periphery of the mesk plate 73, so that light can be passed through said holes 72. In this embodiment, the cassette number and the document size can be recognized by discriminating which hole 38 coincides with the cut-away groove 74 by optical detecting means.

Figure 7:
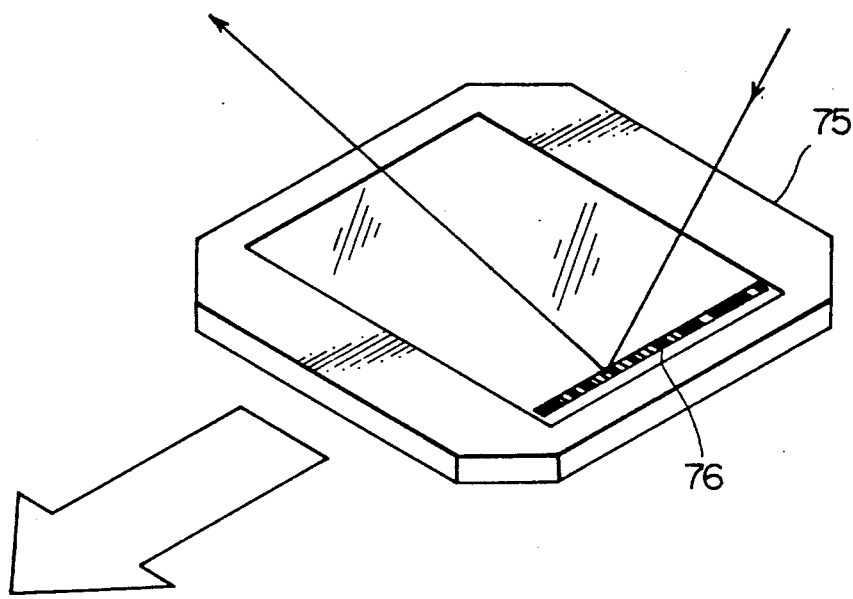

In the further embodiment, a bar code 76 is provided on the mask plate 75 as shown in FIG. 7 so that the document size can be recognized by said bar code 76.

Figure 8:
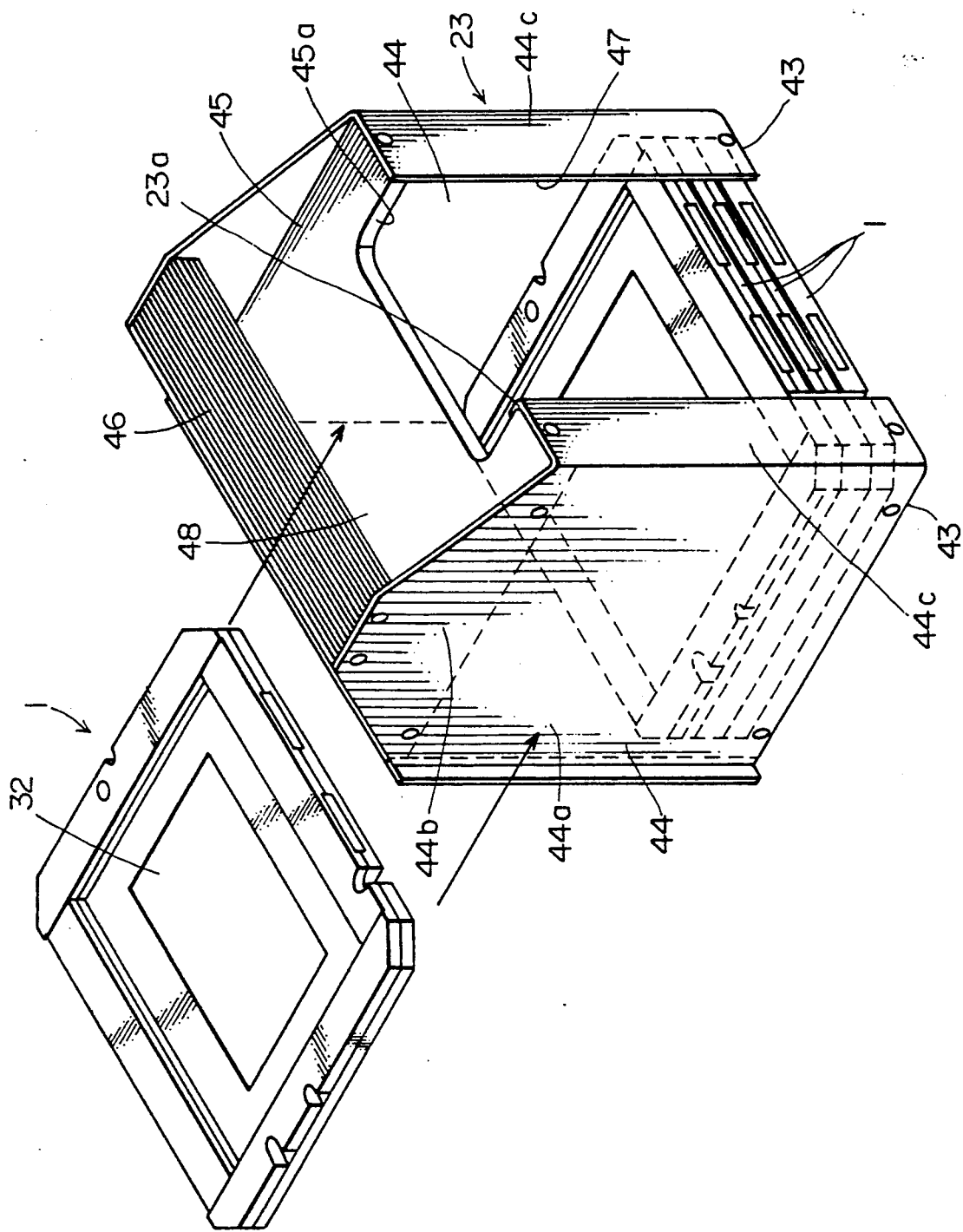
FIG. 8 is a perspective view illustrating an embodiment of the constitution of a stacker.

Described below with reference to FIGS. 8 is the constitution of the cassette holding stacker 23 in which a plurality of cassettes 1 for holding the documents 32 are stacked in the vertical direction. In FIG. 8, the cassette holding stacker 23 is formed of a nearly box shape with a cassette take in-and-out port 48 on the front surface thereof and an opening through which the cassette is pushed out on the rear surface thereof. That is, the stacker 23 is constituted by a pair of bottom plates 43, a pair of side plates 44, and top plate 45.

Each of the pair of side plates 44 has the shape of a mountain-shaped portion 44b on the upper edge of a rectangular portion 44a, and is inwardly folded at its one side edge to form a rear plate portion 44c. The pair of bottom plates 43 are coupled to the lower end of the side plates 44 and to the lower end of the rear plate portions 44c. The top plate 45 has a rectangular shape with a rectangular cut-away groove 45a at the rear end thereof, and is bonded to the upper ends of the rear plate portions 44c and to the boundaries between the square portions 44a and the mountain-shaped portions 44b of the pair of side plates 44.

The top portions of the mountain-shaped portions 44b are connected together by a slender rectangular plate 46 which may serve as a grip when the stacker 23 is to be carried by hand.

The cassette 1 is taken in and out through the port 48 provided on the front surface of the stacker 23. In this case, the plurality of cassettes 1 are placed on the pair of bottom plates 43 and are stacked one upon the other.

A pushing member of the cassette delivery device that will be described later is inserted in the opening 47 formed in the back side of the stacker 23.

Though not shown, the stacker 23 has thereon a protuberance 23a to which will fit the recess 39 formed in the front edge of the cassette 1.

In the stacker 23 is further provided as a unitary structure a portion (not shown) for accommodating data recording media such as floppy disks which are carried together with the cassettes and in which are recorded read data of the document 32 held in the cassette 1, i.e., data used for inputting image such as angle, magnification, and color data of the document 32 corresponding to the number recognizing code of the cassette 1.

In such a case, the image input apparatus is preferably provided with a device which records data in a data recording medium such as the above-mentioned floppy disks, in order to carry out the data recording operation simultaneously with the image input operation. The read data of the document 32 recorded on the data recording medium such as a floppy disk can be read out at any time. Therefore, the operator need not memory the read data of the document 32 and perform the input operation, relying on only his memory. Thus it is possible to obtain reliable data for the subsequent image-input operation.

Means for supplying and returning the cassettes 1 contained in the cassette holding stacker 23 comprises discriminating means (not shown) for discriminating a position of the uppermost cassette 1 stacked in said cassette holding stacker 23, a elevator for moving up and down said cassette holding stacker 23, cassette supply means for taking out the lowermost cassette 1 in said cassette holding stacker 23 and supplying the cassette taken out toward a cassette supply port of the image reading apparatus, cassette return means for taking out the cassette through a cassette discharge port of the image reading apparatus and for returning the cassette taken out toward said cassette holding stacker 23, and elevator control means for controlling said elevator so that when said cassette 1 is supplied to said image reading apparatus the lowermost cassette 1 stored in said cassette holding stacker 23 is coincident in height with said cassette supply port of the image reading apparatus and that when the cassette 1 is returned from said image reading apparatus said cassette discharge port is coincident in height with the uppermost cassette 1 in order to return said cassette 1 on the uppermost cassette 1 stacked in said cassette holding stacker 23 on the basis of the discriminated position.

Figure 9:
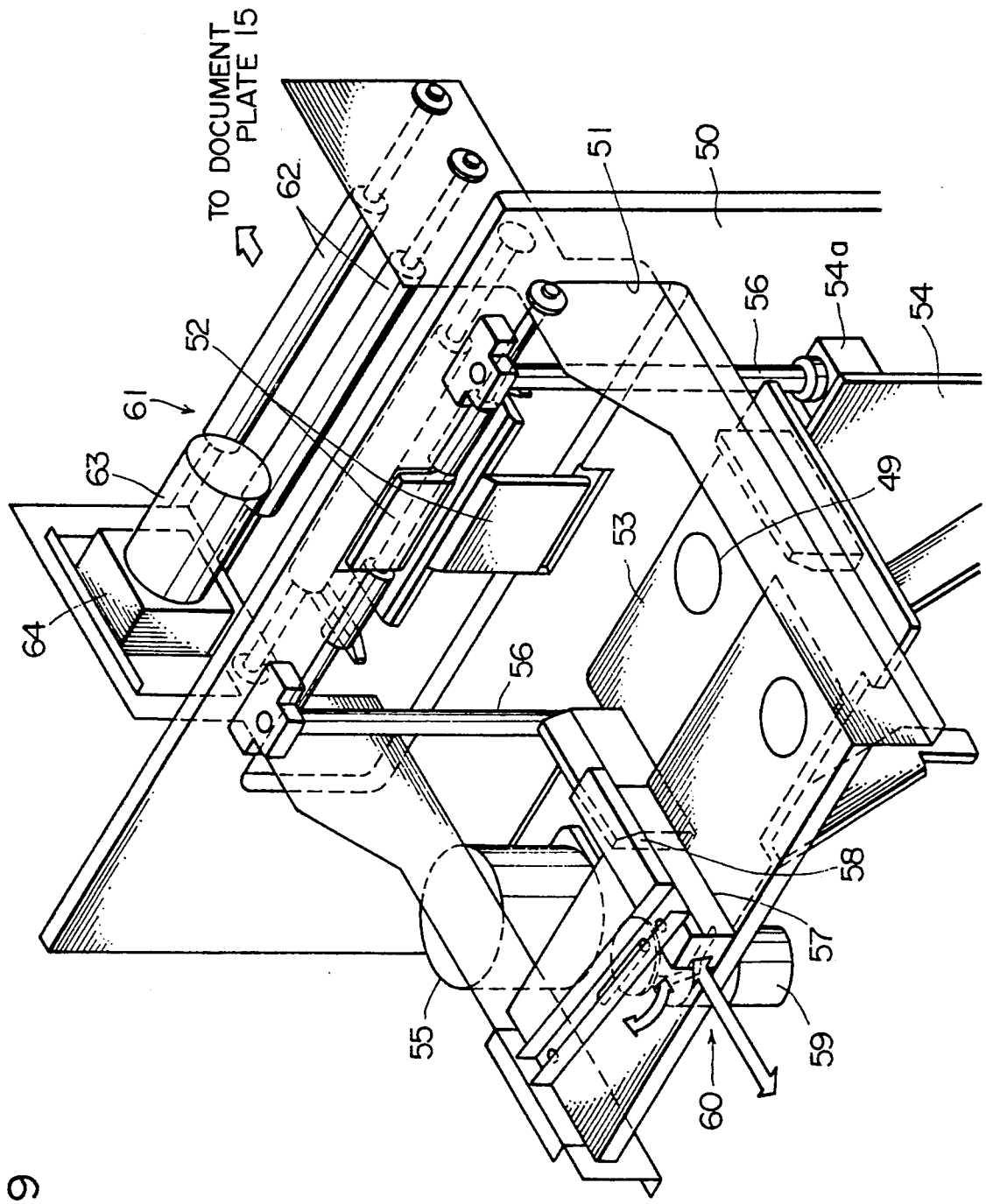
FIG. 9 is a perspective view illustrating the constitution of a stacker driving mechanism.

FIG. 9 is a perspective view illustrating essential part of the cassette supply means.

In this embodiment, the cassette take in-and-out port serves as said cassette supply port and said cassette discharge port.

The cassette supply means comprises a stacker plate 49 which is moved up and down with the stacker 23 placed thereon, a delivery device 57 which pushes forward the cassette 1 positioned at the lowermost stage in the stacker 23 to successively deliver the cassettes from the stacker 23, and a sending device 61 which sends the cassette 1 delivered from the stacker 23 to a document plate 15 on the side of the image reading apparatus through a cassette take in-and-out port 51 described later. The cassette supply means of the present invention is constituted by said delivery device 57 and sending device 61.

Said sending device 61 has also such a function that the cassette 1 is returned on the uppermost cassette 1 stacked in the stacker 23, so that the cassette return means is formed by said sending device 61.

Moreover, the stacker plate 49 is provided with the delivery device 57 that successively delivers the cassettes 1 from the stacker 23 placed and supported on the stacker plate 49.

The delivery device 57 is constituted by a pushing member 58 which is inserted in the stacker 23 through the opening 47 at the back surface of the stacker 23 to come into contact with the rear end of the cassette 1 in order to push the cassette 1 forward, and a drive device 60 which includes a motor 59 and drives the pushing member 58.

On the side of the document plate 15 is provided the sending device 61 that sends the cassette 1 delivered from the stacker 23 to the document plate 15.

The sending device 61 is constituted by a plurality of sending rollers 62 that extend horizontally, i.e., in a lateral direction at nearly the same level as that of the gap between the above-mentioned pair of cassette-guiding plates 52, and that are parallel arranged forward, and a drive device 64 that includes a motor 63 to rotate the sending rollers 62.

A partitioning plate 50 that partitions the side of the stacker plate 49 from the side of the document plate 15, is disposed, extending in a vertical direction.

At the upper part of the partitioning plate 50 is opened the cassette take in-and-out port 51 that extends in the lateral direction, and a pair of cassette-guiding plates 52 for smoothly delivering and introducing the cassettes are vertically disposed with a predetermined clearance in a central portion of the cassette take in-and-out port 51 in the lateral direction. The stacker plate 49 is constituted by a portion 53 for placing stacker 23 thereon, a movable support portion 54, and a drive portion 55.

The movable support portion 54 is supported slidably up and down by a guide device 56 provided on the side surface of the stacker plate 49 via slide mechanical portions 54a that are provided on both sides at the back surface of the movable support portion 54. The drive portion 55 includes a motor 55a and moves the stacker plate 49 up and down to adjust the level of the portion 53 for placing the stacker plate 23 thereon.

The elevator of the present invention is constituted by such stacker plate 49.

The operation of the cassette supply means will now be explained.

In case that the cassette is supplied to the image reading apparatus, the stacker plate 49 is moved upwards and is set at a position where the lowermost cassette 1 in the stacker 23 is in the same level as that of the gap of the guiding plates 52. Then, the pushing member 58 is operated to push forward the cassette 1 at the lowermost position, so that the cassette 1 is delivered through the gap of the guiding plates 52. The delivered cassette 1 is placed on the sending rollers 62 and is sent onto the document plate 15 by the turning of the sending rollers 62.

Other cassettes 1 stacked on the cassette 1 fall due to the force of gravity by a height of the cassette 1 pushed out.

When the document 32 is read out and the cassette is returned from the image reading apparatus, the cassette 1 is moved from the document plate 15 onto the sending rollers 62, and is introduced back into the stacker 23 though the gap of the guiding plates 52 due to the turning of the sending rollers 62. In this case, the elevator is so controlled by the elevator control means that the gap of the guiding plate 52 at the cassette take in-and-out port 51 becomes in the same level of the uppermost position of the cassette on the basis of the result of the discriminating means for discriminating the position of the uppermost cassette 1 stacked in the cassette holding stacker 23, so as to return said cassette 1 on the uppermost cassette 1 stacked in the stacker 23.

In said embodiment, as stated above, the cassette take in-and-out port 51 of the image reading apparatus serves as the cassette supply port and the cassette discharge port. However, in case that the cassette supply port and the cassette discharge port are provided separately on the image reading apparatus, the elevator is so controlled that when the cassette is supplied to image reading apparatus the lowermost cassette 1 contained in the stacker 23 becomes in the same level of the cassette supply port of said image reading apparatus, and when the cassette is returned from the image reading apparatus said discharge port becomes in the same level of the uppermost cassette on the basis of the result of the discriminating means, so as to return the cassette 1 on the uppermost cassette.

Figure 10:
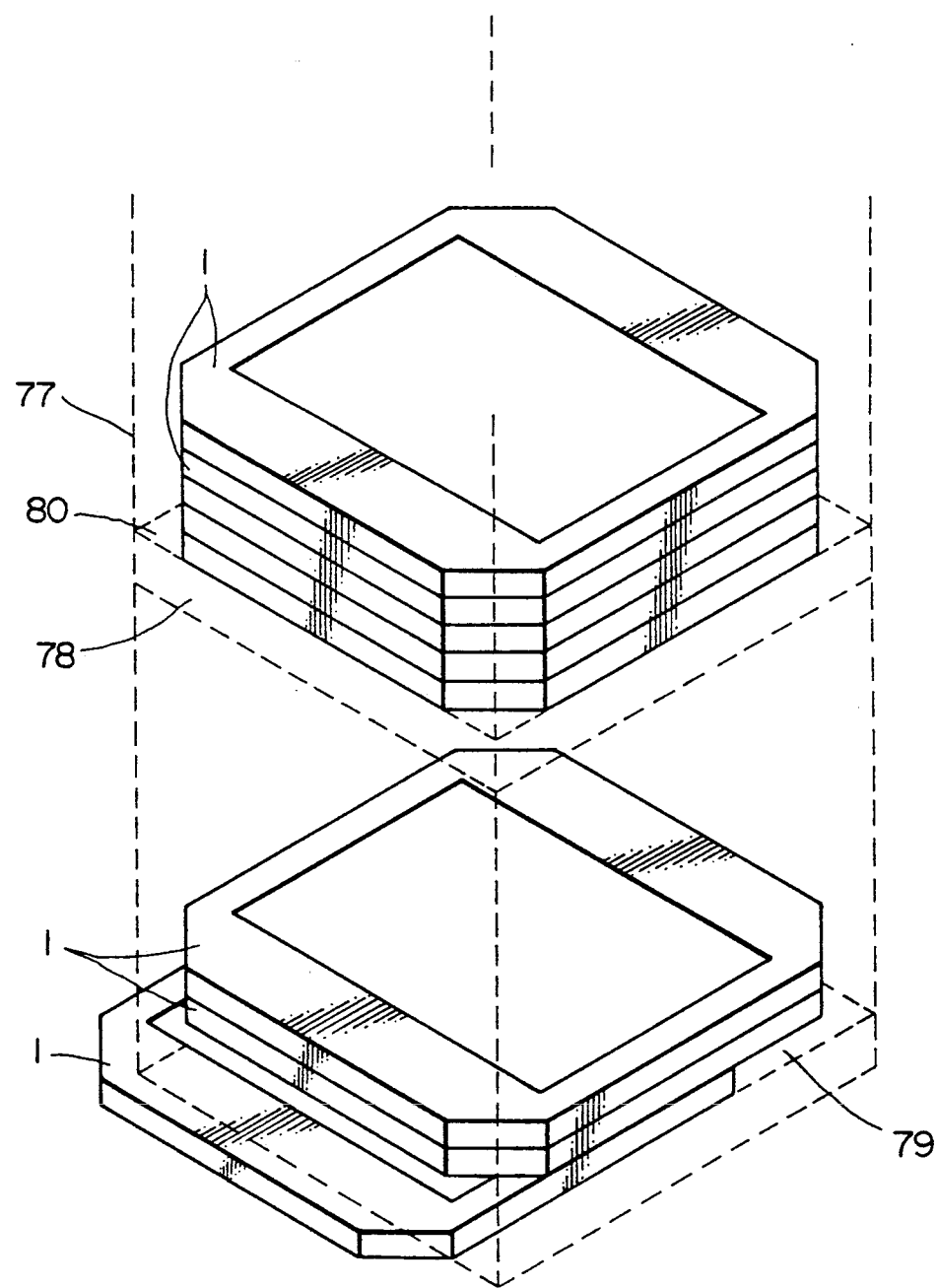
FIG. 10 is a perspective view illustrating another embodiment of the stacker.

In case that the cassette supply port and the cassette discharge port are provided separately on the image reading apparatus as stated above, it is preferable to use a stacker 77 as shown in FIG. 10.

That is, the stacker is provided at the center in the vertical direction thereof with a partition plate 78 for dividing the inside of the stacker 77 into upper and lower stages 79 and 80.

In the lower stage 79, the cassettes 1 to be sent to the image reading apparatus from the lower stage 79 are stacked, and in the upper stage 80, the cassettes 1 to be sent from the image reading apparatus into the upper stage 80 are stacked.

If the number of the cassettes stacked in the stacker is too large, there is the possibility that the lowermost cassette can not be taken out by the weight of the other many cassettes stacked on the lowermost cassette.

In the above embodiment of the present invention, however, the cassettes can be stacked by dividing into the lower and upper stages 79 and 80, even if the cassette supply port and the cassette discharge port of the image reading apparatus are the same port.

Figure 11:
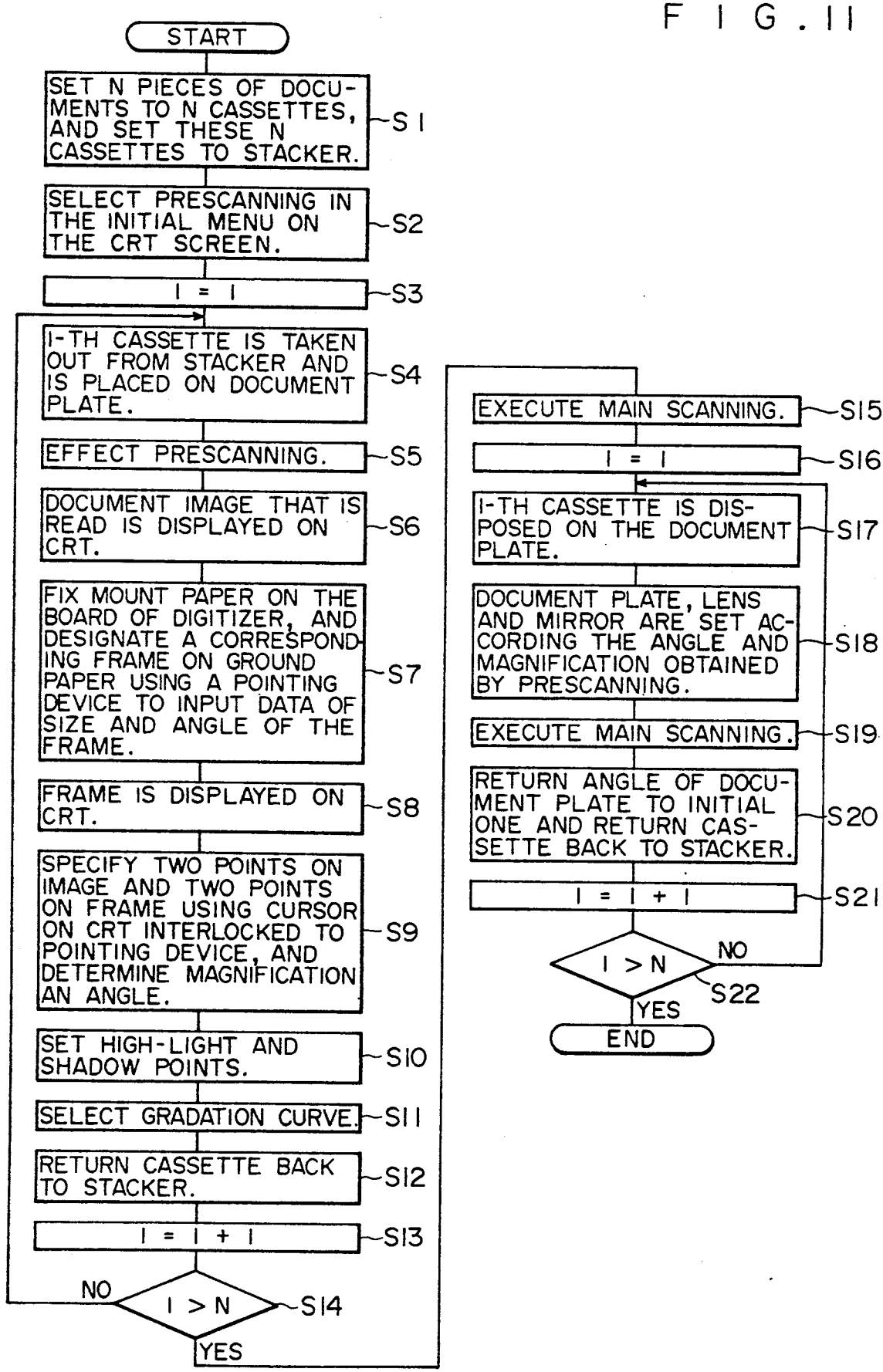
FIG. 11 is a flow chart for explaining the operation of an embodiment of the image reading apparatus of the present invention.

Next, the operation of the embodiment of the thus constituted cassette supply means and the image reading apparatus will be described in conjunction with a flow chart of FIG. 11 and other drawings.

The flow of the fundamental operation of the normal image reading apparatus will be explained.

In the fundamental operation, if the cassettes A, B, C are stacked from below in this order tentative scanning (prescanning), condition setting and main scanning are executed in the order of cassettes A, B and C, as shown in FIG. 12(a).

In said prescanning, the image is read in the thined out manner in a short time of period.

In said condition setting, magnification and angle of resolution, high-light and shadow points are set, and gradation curve of image is specified. Such setting requires a skill and good judge of the operator as described later detailedly.

In said main scanning, the document is read finely according to said condition setting, so that a much time is required but the assistance of the operator is not required. When the main scanning is executed after the prescanning, the delivery/introduction number of the cassette 1 to the stacker 23 reduces, so that the total time becomes shortened.

Further, an economical operation without assistance of the operator may be considered for said fundamental operation.

Accordingly, as shown in FIG. 12(b), the prescanning and the condition setting are carried out in the order of cassettes A, B and C by the skilled operator, respectively. Thereafter, the main scanning is carried out in the order of cassette A, B and C automatically, respectively. The main scanning can be carried out by the other image reading apparatus.

As stated above, if the main scanning for all cassettes is carried out at a time after the prescanning for all cassettes is carried out at a time, the operator needs do nothing at the time of the main scanning. Therefore, either method can be selected depending upon the situation of the workshop.

The following operations of the cassette supply apparatus and the image reading apparatus are based on the flow of economical operation without assistance of the operator.

First, at step 1 (S1) in the flowchart, N pieces of documents are respectively contained in the cassettes 1, which are then set into the stacker 23. At step 2, tentative scanning (prescanning) is selected from items in the initial menu on the CRT screen of the display unit 10.

Next, the I-th ($1 \leq I \leq N$) cassette 1, i.e., the cassette 1 at the lowermost position in the stacker 23 is sent from the stacker 23 onto the document plate 15 of the image reading apparatus by the drive of the motor. At this moment, the number recognizing code is read by the recognition unit 24 (steps 3 and 4).

When the mask plate 33 is attached to the cassette 1 after setting the document 23, the pawl portion 42a of pawl plate 42 slides to a position corresponding to a position of the groove 33a corresponding to the one of the kinds of mask plate 33 prepared in correspondence with the sizes of the documents 32, and whereby one of three hole-closing conditions is obtained as shown in FIG. 5 which is then read by the recognition unit 24, and the size of the documents 32 are input to the image reading apparatus.

Thereafter, the prescanning is executed in step 5.

The prescanning is effected depending upon the size of the document input to the apparatus, and there takes place no unnecessary scanning.

When the document 32 is the one that transmits light, such as a positive film, the transmitted light from the source of light is utilized as shown in FIG. 2. When the document is the one that reflects light, such as a color print, the light is projected from the same side of the lens.

For this purpose, the source of light incorporates a reflector or a condensing unit.

Figure 13:
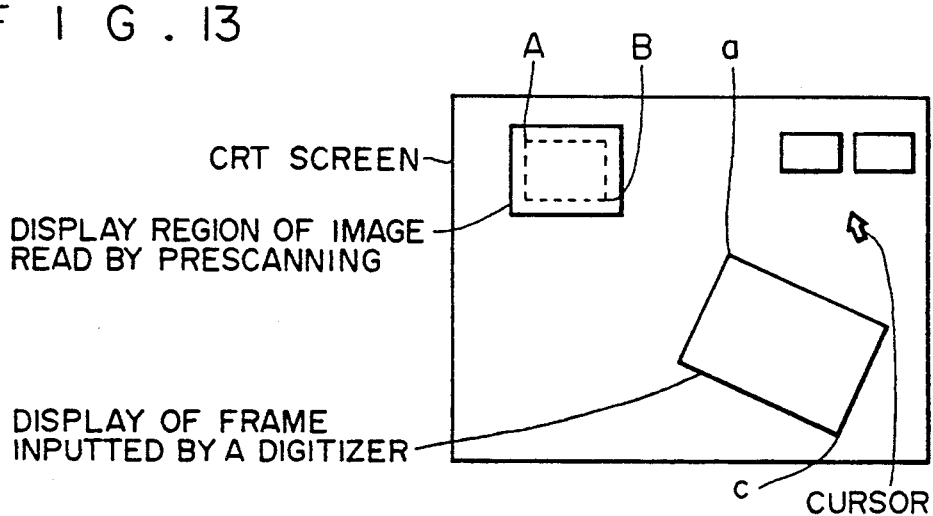
FIGS. 13 to 15 are diagrams explaining the CRT screen display when an image is input.

The image data read by the line sensor 3 are subjected to the correction such as shading correction and zero-level correction through the signal processing circuit 4, the corrected data are stored in the first image memory 6, and are displayed on the CRT of the display unit 10 (S6). This state of display is shown in FIG. 13.

Then, at step 7, a mount is secured onto the board of the digitizer 8, and a frame of image region on the mount is designated by a pointing device. When the frame has a rectangular shape, three points are designated. At step 8, the data such as the size and angle of the frame are read and displayed on the CRT.

Then, at step 9, two points on the image region (points A and B in FIG. 13) and two points on the frame (points a and c in FIG. 13) are specified by the cursor on the CRT screen movable by the pointing device. Thus, the magnification and angle necessary on main scanning for reading the document are determined. The magnification and angle can further be measured by sticking a specific paper on the digitizer 8, and by specifying the two points on the displayed pattern using the pointing device. The thus found magnification and angle are stored in the data memory 12 together with the number recognizing code of the cassette 1.

Step 10 determines the high-light and shadow of the pattern by the document.

Figure 14:
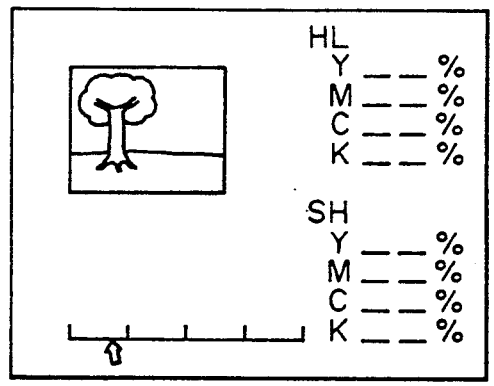

FIG. 14 is a diagram showing an example of display on the CRT screen. An image that is read is displayed at the left upper portion on the screen. If a high-light point of the image is specified by the cursor, the document densities of Yellow Y, Magenta M, Cyan C, and the like are displayed.

Here, halftone dots % of each of the colors are designated by the scale and cursor at the lower portion of the screen and are input. The halftone dots % are also input even for the shadow points. The thus specified halftone dots % are stored in the data memory together with the number recoginizing code of the cassette. The concentration obtained by prescanning is correlated with the halftone dots %. Another method other than this method may be employed.

Figure 15:
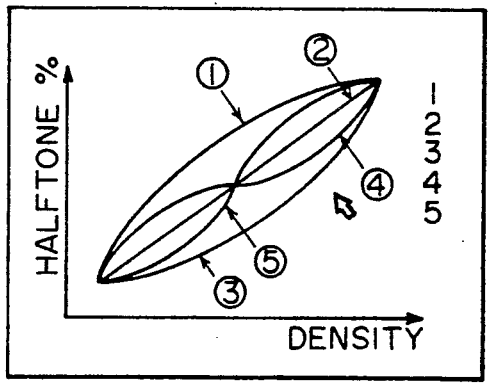
Figure 16:
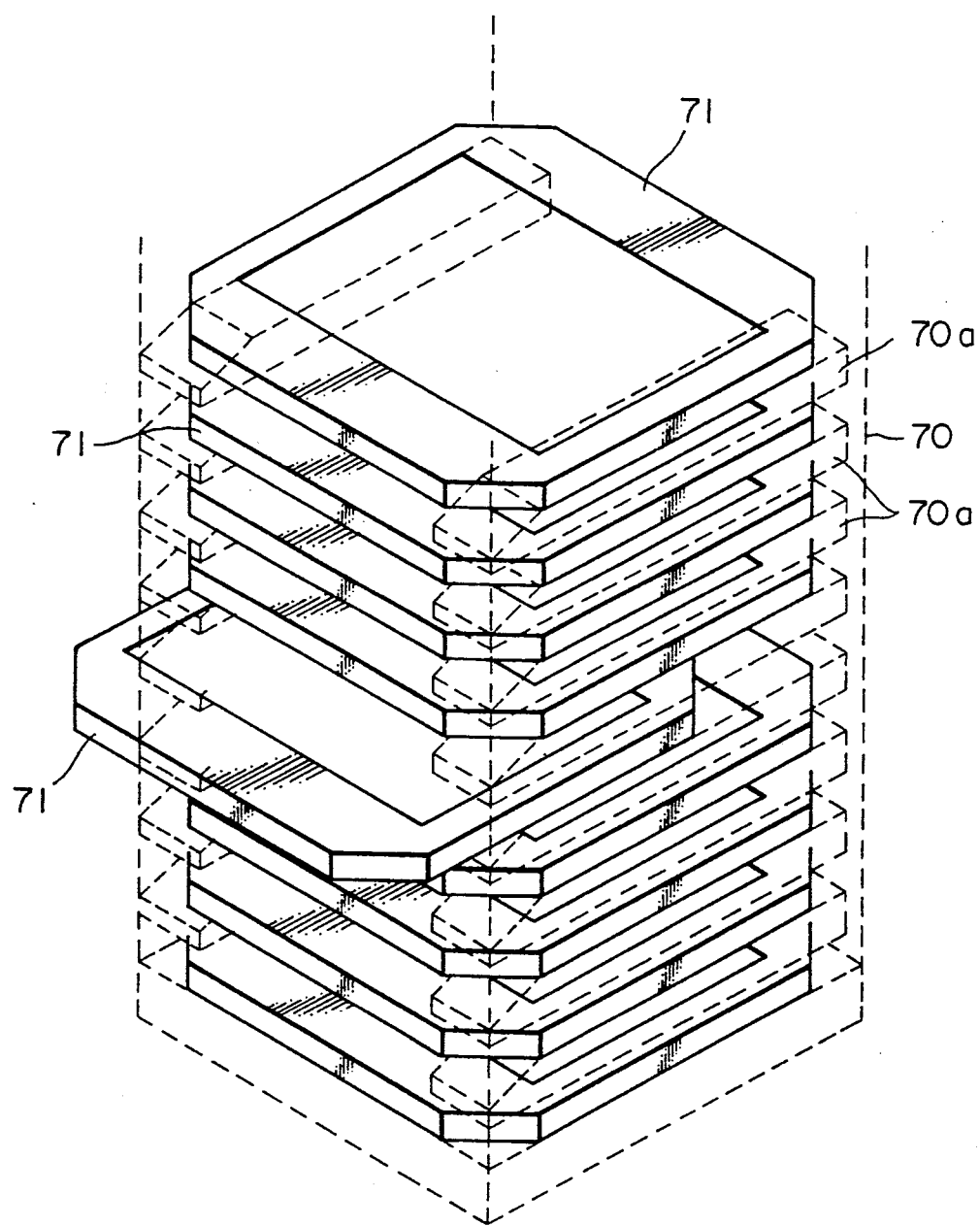
FIG. 16 is a perspective view of the conventional stacker.

Thereafter, a gradation curve of image is designated at step 11. FIG. 15 is a diagram illustrating an example of display on the CRT screen at this moment. In this example, five kinds of gradation curves are shown as basic forms from which any one can be selected. Further, the selected gradation curve can be corrected by the cursor. The characteristics can further be modified by designating one or more intermediate points. The thus obtained gradation curve is stored in the data memory 12 together with the number recognizing code of the cassette 1. It is possible to process by the image processing circuit 5 the image data stored in the first image memory under the thus obtained processing conditions, store the image data in the second image memory, and display the image data on the display unit 10 via the display memory 9.

In step 12, the cassette 1 is returned back to the stacker 23.

The prescanning is effected for all N cassettes 1 through steps 13 and 14.

After the prescanning is finished, in step 15, the main scanning from the initial menu appearing on the CRT screen is selected.

In steps 16 and 17, the first cassette 1 is sent from the stacker 23 onto the document data 15 of the device being driven by the motor. At this moment, the number recognizing code of the cassette 1 is read by the recognition unit 24. The cassette is then held on the document plate 15 which is equipped with a mechanism which turns the cassette 1 around an axis perpendicular to the surface of the document. During this time, the mechanism control unit 13 reads the data such as angle, magnification, etc. stored in the data memory 12 according to the number recognizing code of the cassette 1. At step 18, the mechanism drive unit 14 turns the document plate 15 according to the data of angle. At the same time, position of the lens 2 and position of the V-mirror unit 22 are adjusted according to the data of magnification, thereby to change the size of the optical image formed on the line sensor 3.

In step 19, the cassette 1 on the document plate 15 is sent, and the image of the document 32 is read by the line sensor 3 to effect the main scanning.

The image data read by the line sensor 3 are subjected to the corrections such as shading correction and zero-level correction through the signal processing circuit 4, and are then subjected to the image processing such as color correction, gradation conversion, edge emphasis, etc. necessary for the plate-making through the image processing circuit 5, and are then outputted as plate-making data.

In step 20, the document plate 15 is returned back to the initial state and the cassette 1 is returned back to the stacker 23.

Taking steps 21 and 22, the process for the first cassette 1 is completed.

The above-mentioned main scanning is sequentially effected for the other cassettes 1.

At this moment, the data such as angle, magnification, etc. stored in the data memory 12 are read out in correspondence with the number recognizing code of the cassette 1, and the input of image is executed according to the data.

During the main scanning, the conditions may be varied partly or entirely.

This makes it possible to cope with any special plate-making.

According to the cassette supply apparatus explained as above, the cassette that holds the planar document 32 as it is, i.e., which holds the document 32 in a planar form is used, so that the planar document 32 can easily be handled in its own form and the reading speed of the document 32 can be increased without causing the apparatus to become bulky.

Further, the cassette holding stacker 23 containing therein document holding cassettes 1 stacked in the vertical direction is used, overall height can be reduced and the apparatus can be made compact.

It is not necessary to positioning strictly for the cassette delivery and introduction, so that much labor is not required for the cassette containing.

According to the thus constituted image reading apparatus, the cassettes are downward moved successively in the stacker 23 due to the force of gravity, the cassettes 1 contained in the stacker 23 are always delivered from the lowermost position of the stacker 23, and are introduced back to the uppermost position. Therefore, positioning of the cassette 1 in the stacker 23 and the pushing member 58, and positioning of the cassette take in-and-out port of the image reading apparatus and the uppermost position of the stacker 23 are carried out at the same place, enabling the positioning mechanism to be simplified, enabling the stacker plate 49 for raising and lowering the stacker 23 to be driven through simple control operation, and presenting advantage in cost.

As the cassette 1 has the magnets 36 and 37 of different polarities at the front surface and the rear surface thereof, respectively, the cassettes 1 are coupled and stacked in the stacker 23 by the attracting force of the magnets 36 and 37. Accordingly, it can be judged easily if the cassettes are not properly stacked.

In particular, the following advantage is obtained from the provision of plural kinds of mask plates 33 having a frame-like mask portion 33a along the periphery thereof to mask the peripheral portion of the document 32, the mask plate 33 being detachably mounted on the window 25 of the lower plate 27 of the cassette 1 and having a size corresponding to the size of the document.

That is, plural kinds of mask plates 33 are prepared to meet the documents with such sizes of 35 mm, 6×9 cm, and 4×5 in., and are used for the cassettes 1 of a single kind. Therefore, there is no need of preparing plural kinds of cassettes 1, and thereby it is made possible to decrease the number of parts, to improve parts control, and to decrease the cost for producing the cassettes 1. In order to discriminate the size of the transparent portion of the mask plate 33 by the image reading apparatus, the concave, convex or hole portions, or bar code etc. different according to the size of the transparent portion is provided on the outer periphery of the mask plate as size display means. When the mask plate 33 is mounted, the document size information is automatically input, the reading range is determined according to the document size, in order to eliminate unnecessary reading and to read the document in a required minimum range.

So far, the operator has to input to the image reading apparatus what document is set in each of the cassettes in order to determine the reading range meeting the document size, relying much upon the his memory and including high possibility of causing errors. With the constitution of the present invention which automatically inputs the document size, however, there is little possibility of errors, and the document is read in a required minimum range reliably and correctly.

The foregoing description has dealt with the case where the prescanning and the main scanning are executed using the single stacker 23. It is, however, also allowable to execute the prescanning continuously for the plurality of stackers and, then, execute the main scanning. Moreover, there arises no problem even when there exists a long time interval (due to removal of stacker, stop of operation, etc.) between the prescanning and the main scanning, because the reading conditions have been stored in the data memory. Upon detecting the completion of the prescanning, the main scanning may be automatically performed.

The operation efficiency can be further improved by using a plurality of such image reading apparatuses which are sorted into two groups for prescanning only and for main scanning only.

Ordinarily, the prescanning is carried out at a fixed magnification and at a fixed angle. It is, however, also allowable to vary the magnification and angle for prescanning, to store them as data, and to employ the relative values to the magnification and angle of the prescanning during the main scanning.

The present invention is not limited to the constitutions in the embodiments and can be modified within the scope of claims.

According to the present invention as described above, the cassette supply apparatus comprises the cassette holding stacker for containing therein said document holding cassettes stacked in the vertical direction, the cassette supply means, and the cassette return means, and the elevator is controlled so that when said cassette is supplied to said image reading apparatus the lowermost cassette stored in said cassette holding stacker is coincident in height with the cassette take in-and-out port of the image reading apparatus and that when the cassette is returned from said image reading apparatus said cassette discharge port is coincident in height with the uppermost cassette in order to return said cassette on the uppermost cassette stacked in said cassette holding stacker on the basis of the discriminated position. It is, therefore, allowed to make compact the stacker and to simplify the drive control of the stacker.

In case that the cassette take in-and-out port of said image reading apparatus serves both as the cassette supply port and the cassette discharge port, it is preferable that the lowermost cassette stored in said cassette holding stacker is coincident in height with the cassette take in-and-out port of the image reading apparatus and that said cassette take in-and-out port is coincident in height with the uppermost cassette.

The cassette holding stacker is of nearly box shape having the cassette take in-and-out port in the front surface thereof and the opening for pushing out the cassette in the rear surface thereof, so that the stacker can be made small in size.

It is advantageous that said cassette has magnets different in polarity from each other at the front and rear surfaces thereof, respectively, so that the cassettes are stacked in the cassette holding stacker in a state that the cassettes are connected one another by the mutual magnetic forces of the magnets. Thus, the user can easily judge that the cassettes are not properly stacked.

The cassette has the frame member with the opening portion, the mask plate with the transparent mask portion, the mask plate being the same in size with said opening portion and set to said frame member, and the indicating means for indicating the size of said transparent mask portion. Therefore, there is no need of preparing plural kinds of cassettes 1, and thereby it is made possible to decrease the number of parts, to improve parts control, and to decrease the cost for producing the cassettes 1. Further, the reading range is determined according to the document size, in order to eliminate unnecessary reading and the document is read in a required minimum range reliably and correctly.

Especially, said size indicating means consists of convex portions, concave portions or hole portions different from one another according to the size of the transparent portion, provided on the outer periphery of the mask plate, so that the mask plate is simplified in construction.

Each cassette is taken out from the lowermost position in the stacked cassettes, successively, in order to read formally the cassettes by the image reading apparatus after all cassettes in the cassette holding stacker are read temporarily and the cassette which has been supplied to said image reading apparatus and read temporarily thereby is returned on the uppermost cassette, so that the operator needs do nothing at the time of the main scanning and ecconomical operation without assistance of the operator can be carried out.

Memory means for memorizing on the recording medium at least one of informations obtained by the temporary reading and the formal reading is provided, so that even when there exists a long time interval between the prescanning and the main scanning, the reading conditions, etc. can be stored in the data memory.

What is claimed is:

1. A cassette supply apparatus for supplying a plurality of cassettes, each of which holds a document in a flat state, one by one, in sequence, to an image reading apparatus for reading said documents and converting said documents to electrical signals, said apparatus comprising:
    a cassette holding stacker, adapted to hold said plurality of cassettes stacked, one directly upon the other in a vertical direction,
    discriminating means for discriminating a position of an uppermost cassette stacked in said stacker,
    an elevator for moving said cassette holding stacker in said vertical direction,
    cassette supply means for removing a lowermost cassette from said stacker and supplying the removed cassette to said image reading apparatus through a cassette supply port,
    cassette return means for removing a cassette from said image reading apparatus through a cassette discharge port and returning the discharged cassette to said stacker and,
    an elevator control means for controlling said elevator so that, when a cassette is to be supplied to said image reading apparatus, said lowermost cassette stored in said stacker is coincident in height with said cassette supply port and, when a cassette is returned to the stack through said cassette discharge port, the uppermost position in said stacker is coincident in height with said discharge port,
    when said lowermost cassette is removed from said stacker the cassettes remaining in the stacker are lowered by gravitational force so that the cassette which had been stacked directly upon the removed cassette drops to the lowermost position in the stacker.

2. The cassette supply apparatus according to claim 1, wherein said elevator controlling means controls said elevator so that in case that a cassette take in-and-out port of said image reading apparatus serves both as the cassette supply port and the cassette discharge port and when said cassette is supplied to said image reading apparatus the lowermost cassette stored in said cassette holding stacker is coincident in height with said cassette take in-and-out port of the image reading apparatus and that when the cassette is returned from said image reading apparatus said cassette take in-and-out port is coincident in height with the uppermost cassette in order to return said cassette on the uppermost cassette stacked in said cassette holding stacker on the basis of the discriminated position.

3. The cassette supply apparatus according to claim 1, wherein said cassette holder stacker is of nearly box shape having a cassette take in-and-out port in the front surface thereof and an opening for pushing out a cassette in the rear surface thereof.

4. The cassette supply apparatus according to claim 1, wherein said cassette has magnets different in polarity from each other at the front and rear surfaces thereof, respectively, so that the cassettes are stacked in the cassette holding stacker in a state that the cassettes are connected one another by the mutual magnetic attracting forces.

5. The cassette supply apparatus according to claim 1, wherein said cassette has a frame member with an opening portion, and a mask plate with a transparent mask portion, the mask plate being the same in size with said opening portion and set to said frame member.

6. The cassette supply apparatus according to claim 5, further comprising indicating means for indicating the size of said transparent mask portion is provided on said cassette so that said image reading apparatus can discriminate the size of the transparent portion of the mask plate.

7. The cassette supply apparatus according to claim 6, wherein said size indicating means consists of convex portions, concave portions or hole portions different from one another according to the size of the transparent portion, provided on the outer periphery of the mask plate.

8. An apparatus for feeding cassettes holding documents in a flat state, to an image input means comprising a scanner which scans said documents and produces electric signals representing separate colors corresponding to said documents, said apparatus comprising:
    a stacker having at least a front wall and a back wall, two side walls, and a base, said stacker being adapted to hold said plurality of cassettes stacked, one directly upon the other, in a vertical direction,
    said front wall being formed with a port therein through which cassettes are ejected from said stacker, said rear wall being formed with an opening therein through which a pushing means pushes said cassettes from said stacker,
    a stacker plate on which said stacker is placed and which moves vertically,
    a delivery device which pushes forward the lowermost cassette in said stacker, to successively deliver said cassettes from said stacker, and a sending device which sends said cassette delivered from a lowermost position in said stacker to said scanner and, after scanning, returns said cassette from said scanner to an uppermost position on the stack of cassettes in said stacker,
    said cassettes contained in said stacker always being delivered from the lowermost position in said stacker and returned to said uppermost position in said stacker when a cassette at the lowermost position in said stacker is delivered to said scanner, the remaining cassettes in the stacker are lowered by gravitational force so that the cassette which had been stacked directly upon the removed cassette drops to the lowermost position in the stacker.

* * * * *